United States Patent
Chen et al.

(10) Patent No.: US 8,010,291 B2
(45) Date of Patent: Aug. 30, 2011

(54) PROCESSING MEASUREMENT DATA THAT INVOLVES COMPUTING A DERIVATIVE OF THE MEASUREMENT DATA THAT REPRESENTS A SUBTERRANEAN STRUCTURE

(75) Inventors: Jiuping Chen, Albany, CA (US); David L. Alumbaugh, Berkeley, CA (US); Edward Nichols, Berkeley, CA (US); Stephen A. Horne, Tokyo (JP); Kevin Eyl, Lafayette, CA (US)

(73) Assignee: WesternGeco L.L.C., Houston, TX (US)

( * ) Notice: Subject to any disclaimer, the term of this patent is extended or adjusted under 35 U.S.C. 154(b) by 383 days.

(21) Appl. No.: 12/267,584

(22) Filed: Nov. 8, 2008

(65) Prior Publication Data

US 2010/0121579 A1 May 13, 2010

(51) Int. Cl.
*G01V 1/28* (2006.01)
*G01V 3/38* (2006.01)
*G01V 1/00* (2006.01)
*G01V 3/00* (2006.01)
*G06F 19/00* (2011.01)
*G06F 17/40* (2006.01)

(52) U.S. Cl. ............ 702/11; 73/152.01; 166/250.01; 181/102; 250/353; 324/323; 367/21; 367/38; 702/6; 702/189

(58) Field of Classification Search ............ 73/152.01, 73/152.02, 432.1, 865.8, 866; 166/244.1, 166/248, 250.01, 250.16, 254.1; 175/40, 175/41, 50; 181/101, 102; 250/253; 324/323, 324/332, 344, 345, 347, 348; 367/14, 21, 367/37, 38; 702/1, 2, 6, 7, 8, 11, 57, 127, 702/187, 189, 190
See application file for complete search history.

(56) References Cited

U.S. PATENT DOCUMENTS

| | | | | |
|---|---|---|---|---|
| 3,324,385 A | * | 6/1967 | Hings | 324/345 |
| 3,490,032 A | * | 1/1970 | Zurflueh | 324/345 |
| 6,597,178 B1 | * | 7/2003 | Nichols et al. | 324/339 |
| 2006/0186887 A1 | | 8/2006 | Strack et al. | |
| 2008/0091356 A1 | | 4/2008 | Alumbaugh et al. | |
| 2008/0169817 A1 | | 7/2008 | Morrison et al. | |

FOREIGN PATENT DOCUMENTS

| | | |
|---|---|---|
| GB | 2411006 A | 8/2005 |
| GB | 2466764 | 7/2010 |
| WO | 2003100467 A1 | 12/2003 |
| WO | 2004109338 A1 | 12/2004 |
| WO | 2005010560 A1 | 2/2005 |

OTHER PUBLICATIONS

PCT Search Report, dated Jun. 11, 2010, Application No. PCT/US2009/062224.
Peter Bannister, New Simplified Formulas for RLF Subsurface-to-Subsurface Propagation, IEEE Journal of Oceanic Engineering, Jul. 1984, pp. 154-158, vol. OE-9, No. 3.
Maao et al., Enhanced Subsurface Response for Marine CSEM Surveying, SEG Houston 2009 International Exposition and Annual Meeting, Oct. 25-30, 2009 (5 pages).

* cited by examiner

*Primary Examiner* — Edward R Cosimano (57) ABSTRACT

To process measurement data representing a subterranean structure, a derivative of the measurement data collected by at least one survey receiver is computed, with respect to frequency. A response representing the subterranean structure is then computed based on the derivative of the measurement data, where the response contains an air-wave component that has been suppressed due to computing the derivative of the measurement data relative to at least another component that is sensitive to the subterranean structure.

20 Claims, 6 Drawing Sheets

PROCESSING MEASUREMENT DATA THAT INVOLVES COMPUTING A DERIVATIVE OF THE MEASUREMENT DATA THAT REPRESENTS A SUBTERRANEAN STRUCTURE

TECHNICAL FIELD

The invention relates generally to processing measurement data that involves taking a derivative of the measurement data representing a subterranean structure.

BACKGROUND

Various electromagnetic (EM) techniques exist to perform surveys of a subterranean structure underneath a surface for identifying subterranean elements of interest. Examples of subterranean elements of interest in a subterranean structure include hydrocarbon-bearing reservoirs, gas injection zones, thin carbonate or salt layers, and fresh-water aquifers. One survey technique is the magnetotelluric (MT) survey technique that employs time measurements of electric and magnetic fields (which are responsive to naturally occurring electromagnetic fields) for determining the electrical conductivity distribution beneath the surface. Another survey technique is the controlled source electromagnetic (CSEM) survey technique, in which an EM transmitter, called a "source," is used to generate EM signals. With either survey technique, surveying units, called "receivers," are deployed on a surface (such as at the sea floor or on land) within an area of interest to make measurements from which information about the subterranean structures can be derived. The receivers may include a number of sensors for detecting any combination of electric fields, electric currents, and magnetic fields.

A major issue associated with CSEM surveying for detecting thin resistive targets at depth in a subterranean structure is the so-called "air-wave effect," which is caused by the air-water interface. The air-wave effect is caused by an EM signal portion generated by an EM transmitter that follows a path extending upward from the EM transmitter, through the air, and then back vertically downward through the body of water to an EM receiver. This air-wave signal component is insensitive to thin resistive targets at depth in a subterranean structure and can interfere with accurate characterization of the subterranean structure when processing survey measurement data.

SUMMARY

In general, according to an embodiment, a method of processing measurement data representing a subterranean structure includes receiving the measurement data collected by at least one survey receiver, and taking a derivative of the measurement data. A response representing the subterranean structure is computed based on the derivative of the measurement data. The response contains an air-wave component that has been suppressed due to taking of the derivative of the measurement data.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In general, according to some embodiments, a controlled source electromagnetic (CSEM) survey technique is provided for acquiring measurement data using EM receivers, where the measurement data is processed to reduce undesirable signal components in the measurement data. One such undesirable signal component is an air-wave signal component. Reduction of undesirable signal components is achieved by computing a gradient of the measurement data, accomplished by taking a derivative of the measurement data with respect to frequency. Taking the derivative of the measurement data with respect to frequency tends to suppress the air-wave signal component of the measurement data. As a result, the response obtained according to processing of the measurement data according to some embodiments is a response in which the air-wave signal component has been suppressed to enable more accurate characterization of the subterranean structure. In this manner, subterranean elements of interest, such as thin resistive bodies including hydrocarbon-bearing reservoirs, gas injection zones, thin carbonate or salt layers, fresh-water aquifers, and so forth, can be more readily detected using the subterranean processing.

The air-wave signal component of a response is caused by the air-wave effect. In a marine survey context (in which EM signal sources and receiver are placed in a body of water), the air-wave effect is caused by an EM signal portion generated by a signal source following a path extending upwardly from the signal source to the water surface, through the air, and then back vertically downward through the body of water to an EM receiver. The air-wave effect is especially pronounced in a shallow-water environment (where water depths are less than 300 meters). However, the air-wave effect can also be present in certain deep-water applications, such as in water having depth greater than 300 meters where the EM source is provided close to the air-water interface. The air-wave signal component is insensitive to thin resistive targets at depth in a subterranean structure, and can dominate other EM surveying signal components that are sensitive to the thin resistive targets at depth. As a result, the air-wave effect can interfere with accurate characterization of a subterranean structure when processing survey measurement data.

The air-wave effect is also an issue that exists in land-based surveying.

Figure 1:
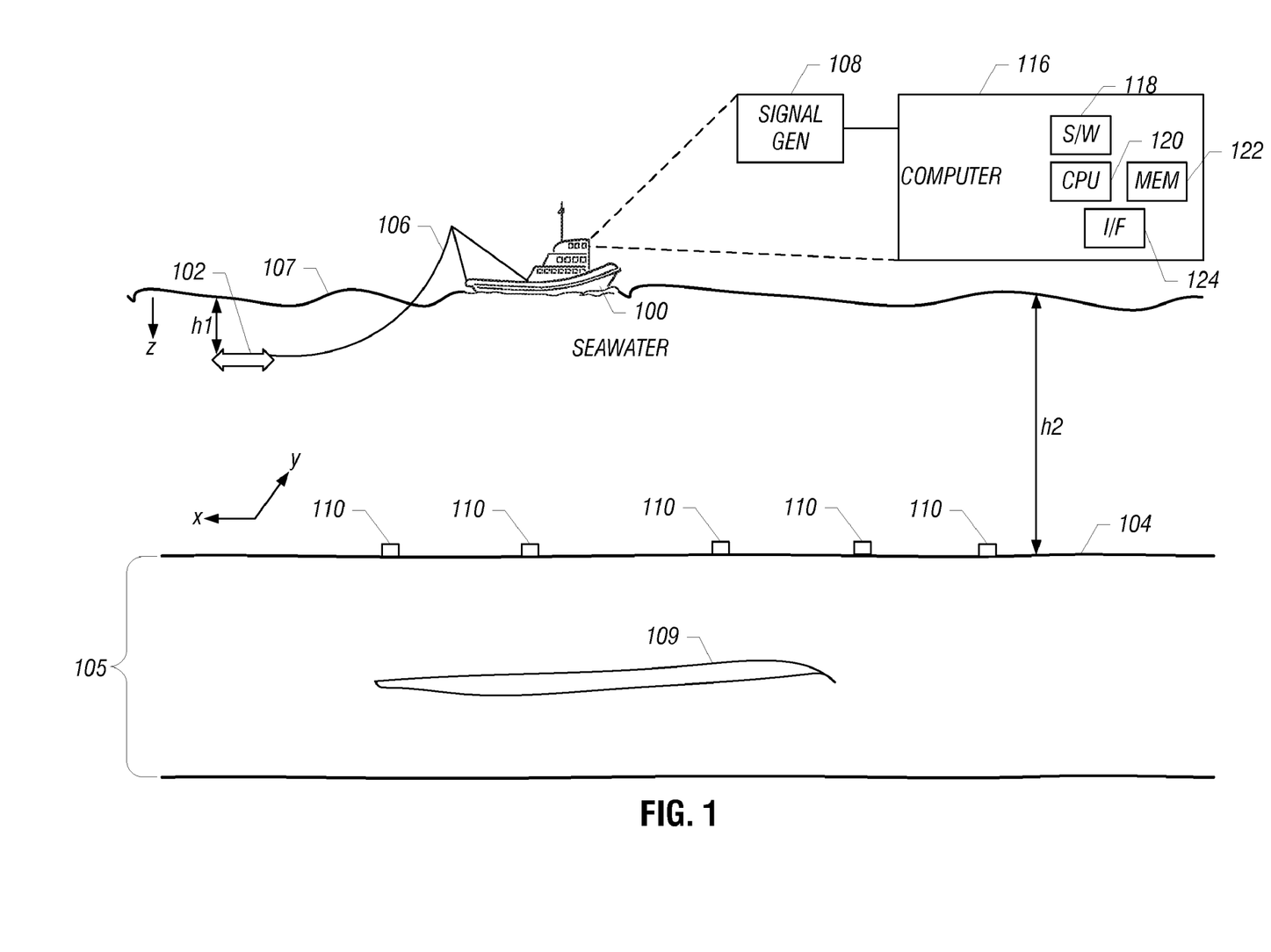
FIG. 1 depicts an example marine survey arrangement that includes a survey signal source and a survey signal receiver in a body of water for performing surveying in a marine environment of a subterranean structure underneath a water bottom surface.

FIG. 1 depicts a marine environment that includes a survey signal source (e.g., EM transmitter) 102 towed at or near the water top surface 107 (e.g., sea surface) for surveying a subterranean structure 105. The depth of the EM transmitter 102 is represented as h1, where $h1 \geq 0$. The subterranean structure 105 includes a resistive body 109 of interest, such as a hydrocarbon-bearing layer, a gas injection zone, a thin carbonate or salt layer, a fresh water aquifer, and so forth. The EM signals generated by the EM transmitter 102 are affected by the subterranean structure 105, and the signals detected at one or more EM receivers 110 located on the surface (in this case the water bottom surface 104) is representative of that effect.

In FIG. 1, multiple EM receivers 110 are located on or near the water bottom surface 104 (e.g., sea floor). Each EM receiver 110 includes a sensor module having sensing elements to sense one or more of electric fields, electric currents, and magnetic fields. In one example, a plurality of EM receivers 110 are arranged on the water bottom surface 104 in a row (in a direction depicted as x). In other examples, the EM receivers 110 can have other arrangements, such as a square array of receivers or even a random arrangement of receivers. The depth of the EM receivers 110 is represented as h2. In alternative implementations, instead of being provided at the water bottom surface 104, the EM receivers 110 can be towed through the body of water.

In yet another implementation, survey techniques according to some embodiments can also be used in land-based surveying to suppress air-wave signal components.

As further depicted in the marine arrangement of FIG. 1, a marine vessel 100 is capable of towing the EM transmitter 102 in the body of water. In the example shown in FIG. 1, the EM transmitter 102 is a horizontal electrical dipole transmitter. Other types of transmitters are also possible. For example, a horizontal magnetic dipole transmitter may be used. Vertical electric and magnetic dipole transmitters may also be used. In addition, other non-dipole transmitters may be used.

The example marine arrangement of FIG. 1 can be a shallow water arrangement or a deep water arrangement. In a shallow water arrangement, the depth of the water bottom surface 104 relative to the water top surface 107 is less than 300 meters (m). However, in a deep water arrangement, the depth of the water bottom surface 104 (relative to the water top surface 107) is greater than or equal to 300 meters.

The EM transmitter 102 is coupled by a tow cable 106 (or multiple tow cables) to a signal generator 108 on the marine vessel 100. The signal generator 108 controls the frequencies, magnitudes, and phases of the EM signals generated by the transmitter 102.

Each of the EM receivers 110 includes a storage device for storing data from measurements made by the receivers 110. The stored measurement data is retrieved at a later time, such as when the receivers 110 are retrieved to the marine vessel 100. The retrieved measurement data can be uploaded to a computer 116 on the marine vessel 100. The computer 116 has analysis software 118 capable of analyzing the measurement data for the purpose of determining information about the subterranean structure 105. The analysis software 118 in the computer 116 is executable on a central processing unit (CPU) 120 (or plural CPUs), which is coupled to a storage 122. An interface 124 that is coupled to the CPU 120 is provided to allow communication between the computer 116 and an external device. For example, the external device may be a removable storage device containing measurement data measured by the receivers 110. Alternatively, the interface 124 can be coupled to a communications device for enabling communications of measurement data between the computer 116 and the receivers 110, where the communications can be wired communications or wireless communications. The wired or wireless communications can be performed when the receivers 110 have been retrieved to the sea vessel 100. Alternatively, the wired or wireless communications can be performed while the receivers 110 remain on the water bottom surface 104.

Alternatively, instead of providing the computer 116 (and the analysis software 118) on the marine vessel 100, the computer 116 can instead be located at a remote location (e.g., at a land location). The measurement data from the receivers 110 can be communicated from the marine vessel 100 to the remote location. In one example, the information is communicated by a wireless link, such as a satellite link.

As noted above, according to some embodiments, the processing performed by the processing software 118 can involve the taking of the derivative of the measurement data (e.g., measured electrical fields) collected by the EM receivers 110 with respect to frequency, in which taking the derivative of the measurement data suppresses the air-wave signal component in a response that represents the subterranean structure 105. Suppressing the air-wave signal component refers to any processing in which the non-air-wave signal component(s) (referred to as the subsurface-sensitive signal component(s)) of the measurement data is (are) enhanced relative to the air-wave signal component. Such suppression can be performed by any one of the following: (1) enhance the subsurface-sensitive signal component(s) while reducing the air-wave signal component; or (2) enhance both the subsurface-sensitive signal component and air-wave signal component, but with the subsurface-sensitive signal component enhanced more than the air-wave signal component.

Although the EM field measured by a receiver in a complex environment cannot easily be decoupled into components that are generated by the subterranean structure 105, components generated by the body of water, components generated by the air-water interface, and so forth, the analysis of simplified cases can provide insight into eliminating components that contain no subsurface information. In one example, for an EM dipole source located below the surface of a conductive earth of uniform conductivity (as in the case of an electric dipole source located in the body of water over a uniform half space of approximately the same electrical conductivity as water), if both the source depth (h1) and receiver depth (h2) are smaller than the lateral separation (ρ) between the source and receiver, then the electric and magnetic fields can be written as $$E, H \approx D + I + L, \quad \text{(Eq. 1)}$$

where D represents a "direct-wave" response produced by a dipole source in a medium of uniform conductivity corresponding to that of the earth, I represents a "modified-image term" that would be generated by a second source also located in a earth of uniform conductivity, but positioned a distance approximately equal to 2·h1 above the true source, and L is defined as a "lateral wave" which is described as attenuating as it travels straight upwardly from the source to the air-water interface, traveling laterally along the air-wave interface with the amplitude decreasing only through 1/ρ3 geometrical spreading, and then attenuating as it travels vertically downward from the air-water interface to the receiver. In a general 3D resistivity model, the direct-wave response D is believed to be only sensitive to the host medium in which both transmitter and receiver are seated. In FIG. 1, the host medium is sea water. So the direct-wave response is more likely the 'primary' field as commonly used in the geophysical community. The modified-image response I is then a signal component in the total response that is sensitive to the resistive body 109 in the subterranean structure 105 of FIG. 1. This image response can be thought as the sum of all multiple 'reflected' waves arising from the presence of multiple resistivity layer interfaces, while the lateral-wave response L is much less sensitive to the resistive body 109. In a simplified 1D model with only two uniform half-spaces (air and earth or water) as explained in this application, these three components are easily calculated with analytic expressions that depend only on the water conductivity σ, the depths of the sources and receivers below the water top surface 107, and the relative distances between the source and receiver. For instance, the radial electric field $E_\rho(\rho,z,\phi)$ due to an electric dipole source (HED) located at (0,h1,0) in a cylindrical coordinate system is given by $$E_\rho(\rho, z, \phi) = \frac{p\cos\phi}{2\pi\sigma\rho^3} \left\{ \left[(1+k\rho) - (3+3k\rho+k^2\rho^2)\frac{(h2-h1)^2}{2\rho^2}\right] e^{-kR_0} - \left[(3+3k\rho+k^2\rho^2)\frac{(h2+h1)^2}{2\rho^2}\right] e^{-kR_1} + [(1+k_0\rho+k_0^2\rho^2 F)]e^{-k_0\rho}e^{-k(h2+h1)} \right\}$$ (Eq. 2)

where
p: dipole moment for the HED,
ρ: radial distance between a receiver and the HED,
h2: vertical depth of the receiver below the water top surface,
φ: azimuthal angle from the HED and a receiver position (for inline mode, φ=0),
h1: vertical depth of the dipole source,
σ: conductivity of the water
$R_0$: distance between the receiver and the HED, which is computed by, $$R_0 = \sqrt{\rho^2 + (h2-h1)^2},$$ (Eq. 3)

$R_1$: distance between the receiver and the image source, which is given $$R_1 = \sqrt{\rho^2 + (h1+h2)^2},$$ (Eq. 4)

k: wavenumber in the water, which is expressed as $$k = \sqrt{i\omega\mu_0\sigma} = \frac{1+i}{\delta},$$ (Eq. 5)

and i: $\sqrt{-1}$
ω: angular frequency, which relates to the frequency f of the operation, $$\omega = 2\pi f,$$ (Eq. 6)

$\mu_0$: magnetic permeability in the free space, $\mu_0 = 4\pi \times 10^{-7}$,
δ: skin depth in the water, which can be calculated by $$\delta = \sqrt{\frac{2}{\omega\mu_0\sigma}} \approx 503 \cdot \sqrt{\frac{1}{f\sigma}},$$ (Eq. 7)

(for example, assume f=0.25 Hz and σ=3.33 S/m, then δ=550 m),
$k_0$: wavenumber in the free space, which has an expression $$k_0 = i\omega\sqrt{\mu_0\epsilon_0} \approx i 2.1 \times 10^{-8},$$ (Eq. 8)

$\epsilon_0$: dielectric permittivity in the free space, $\epsilon_0 = 8.854 \times 10^{-12}$,
F: the Sommerfeld surface-wave attenuation function, which can be approximated as F≅1.0 for small numerical distances. This is true for the case in which the frequency is low, and the offset between the transmitter and receiver is generally less than 100 km (kilometers).

From the exponential terms in Eq. 2, the "direct-wave" component (D), "modified image term" component (I), and "lateral wave" component (L) are expressed as:

$$D = \frac{p\cos\phi}{2\pi\sigma\rho^3} \left\{ \left[(1+k\rho) - (3+3k\rho+k^2\rho^2)\frac{(h2-h1)^2}{2\rho^2}\right] e^{-kR_0} \right\},$$ (Eq. 9)

$$I = \frac{p\cos\phi}{2\pi\sigma\rho^3} \left\{ \left[-(3+3k\rho+k^2\rho^2)\frac{(h2+h1)^2}{2\rho^2}\right] e^{-kR_1} \right\}, \text{ and}$$ (Eq. 10)

$$L = \frac{p\cos\phi}{2\pi\sigma\rho^3} \{[(1+k_0\rho+k_0^2\rho^2)]e^{-k_0\rho}e^{-k(h2+h1)}\}.$$ (Eq. 11)

Notice that the assumptions made in Eq. 2 are $$|n^2| \geq 10,$$ (Eq. 12)

and $$\rho \geq 3(h1+h2),$$ (Eq. 13)

where n is the index of refraction, which is defined as $$n = \frac{k}{k_0}.$$ (Eq. 14)

It is thus easy to estimate $$|n^2| = \frac{k^2}{k_0^2} = \frac{\sigma}{\omega\epsilon_0} \approx 2.4 \times 10^{11} \gg 10$$ (Eq. 15)

when σ=3.3 S/m, and f=0.25 Hz. Therefore there is no need to worry about the first assumption (Eq. 12).

The processing according to some embodiments involves the derivation of gradients (derivatives) of each component with respect to angular frequency. In the derivation process, the following equations are used:

$$\frac{\partial k}{\partial \omega} = \frac{i\mu_0\sigma}{2k} = \frac{1}{2\omega} \cdot \frac{1+i}{\delta},$$ (Eq. 16)

$$\frac{\partial k_0}{\partial \omega} = i\sqrt{\mu_0\epsilon_0} \approx i \cdot 3.33 \times 10^{-9}.$$ (Eq. 17)

Taking the derivatives of Eqs. 9, 10, 11 (expressions for D, I, and L, respectively) in turn, the following simplified expressions are derived:

$$\frac{\partial D}{\partial \omega} = \alpha_D \cdot D,$$ (Eq. 18)

$$\frac{\partial I}{\partial \omega} = \alpha_I \cdot I,$$ (Eq. 19)

and $$\frac{\partial L}{\partial \omega} = \alpha_L \cdot L.$$ (Eq. 20)

The coefficients $\alpha_D$, $\alpha_I$, and $\alpha_L$ are expressed as:

$$\alpha_D = -\frac{1+i}{2\omega} \cdot \frac{\rho}{\delta} \left\{ 1 - \frac{1 - (3+2k\rho)\frac{(h2-h1)^2}{2\rho^2}}{(1+k\rho) - (3+3k\rho+k^2\rho^2)\frac{(h2-h1)^2}{2\rho^2}} \right\}, \quad \text{(Eq. 21)}$$

$$\alpha_I = -\frac{1+i}{2\omega} \cdot \frac{\rho}{\delta} \left\{ 1 - \frac{3+2k\rho}{3+2k\rho+k^2\rho^2} \right\} \text{ and} \quad \text{(Eq. 22)}$$

$$\alpha_L = -\frac{1+i}{2\omega} \cdot \frac{h1+h2}{\delta}. \quad \text{(Eq. 23)}$$

The total derivative is given by the sum $$\frac{\partial E_\rho}{\partial \omega} = \alpha_D \cdot D + \alpha_I \cdot I + \alpha_L \cdot L \text{ or} \quad \text{(Eq. 24)}$$

$$\frac{\partial E_\rho}{\partial f} = 2\pi(\alpha_D \cdot D + \alpha_I \cdot I + \alpha_L \cdot L) \quad \text{(Eq. 25)}$$

where ω is the angular frequency and f is frequency. Eqs. 21-25 indicate that compared with the original field, the attenuation or enhancement in the derivatives are controlled by the three coefficients, which will be analyzed below.

Eqs. 21 and 22 can be further simplified as follows:

$$|k\rho| = \left| \sqrt{i\omega\mu_0\sigma} \, \rho \right| = \left| \frac{\rho}{\delta}(1+i) \right| = \frac{\sqrt{2}\rho}{\delta} \gg 1, \quad \text{(Eq. 26)}$$

because typically a survey operation is interested in the signals at offsets ranging from, say 2 km to 15 km. Also usually |h2−h1|≪ρ. Then Eqs. 21 and 22 can be approximated by $$\alpha_D = \alpha_I = -\frac{1+i}{2\omega} \cdot \frac{\rho}{\delta}. \quad \text{(Eq. 27)}$$

The scenarios in which taking the derivative of measurement data to suppress the air-wave effect would be possible include a shallow water scenario or a deep water scenario.

Figure 2A:
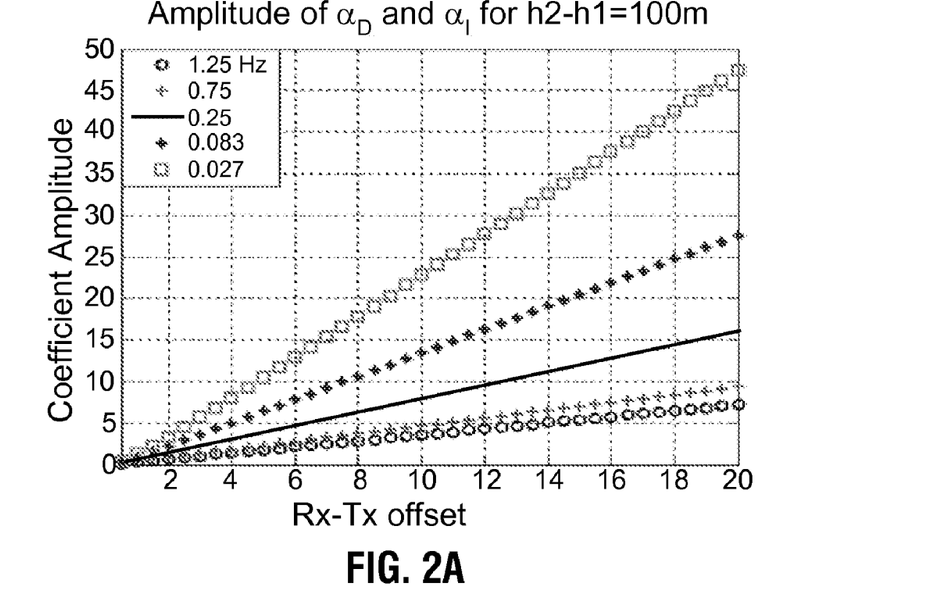
FIGS. 2A-2B, 3A-3B, and 4A-4B are graphs depicting coefficient amplitudes as a function of receiver-transmitter offsets.
Figure 2B:
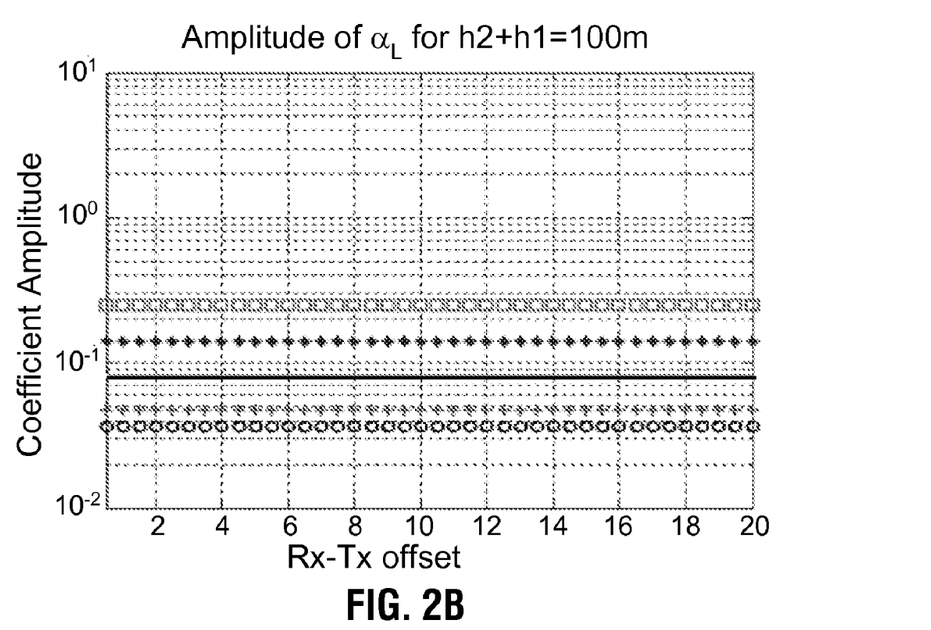

In the shallow water scenario, the water depth is assumed to be less than 300 m, and the receiver is located at the water bottom surface 104 (FIG. 1) (h2=water depth), and the transmitter is on the water top surface 107 (h1=0). FIGS. 2A-2B illustrate results for the three coefficients $\alpha_D$, $\alpha_I$, and $\alpha_L$ with an example water depth of 100 m. Five frequencies (1.25, 0.75, 0.25, 0.083, and 0.027 Hz) are used.

As depicted in FIG. 2A, the coefficients $\alpha_D$ and $\alpha_I$ for the direct wave and modified image wave, respectively, as a function of transmitter-receiver offsets are straight lines with different slopes for different frequencies. For instance, when the frequency=0.25 Hz, and the offsets range from 4~10 km, both $\alpha_D$ and $\alpha_I$ are in the range of 3~8. In other words, the derivatives of direct-wave and image wave with respect to angular frequency are enhanced by a factor 3~8 compared to the original direct-wave and image-wave themselves.

On the other hand, as shown in FIG. 2B, the coefficient $\alpha_L$ for the lateral-wave (or air-wave) is a flat line with am amplitude less than 1. This suggests that the lateral wave has been suppressed against the original lateral-wave itself. For example, when the frequency=0.25 Hz, and the transmitter-receiver offsets range from 4~10 km, $\alpha_L$=0.08. This means the lateral wave has been attenuated by a factor of 12.

Therefore, in the shallow water scenario, it is expected that taking the derivative of electric field with frequency will significantly suppress the air-wave effect and at the same time enhance the direct and image fields which include the responses from the thin resistor at depth.

Figure 3A:
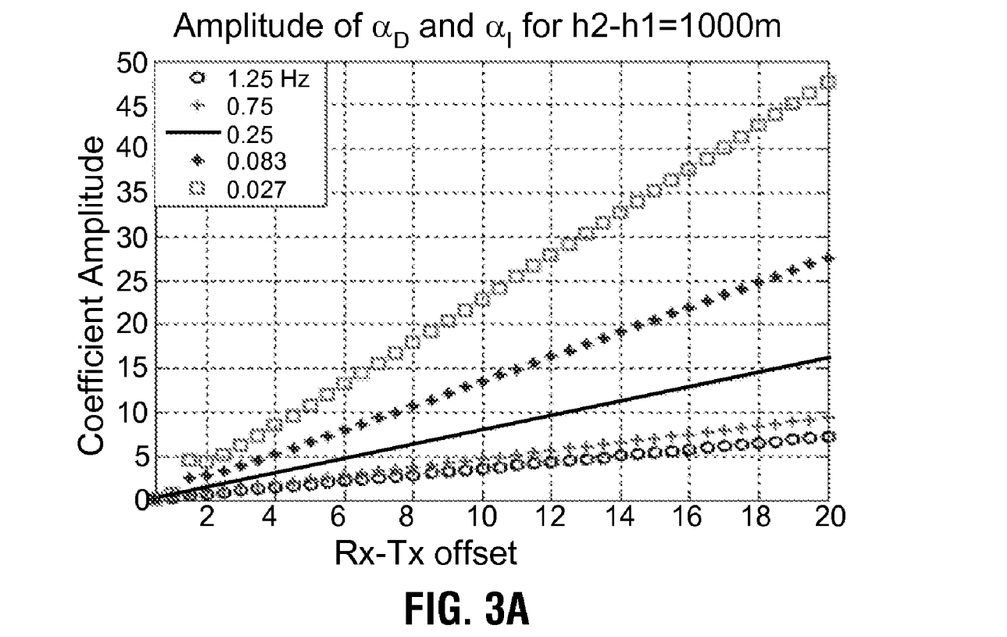
Figure 3B:
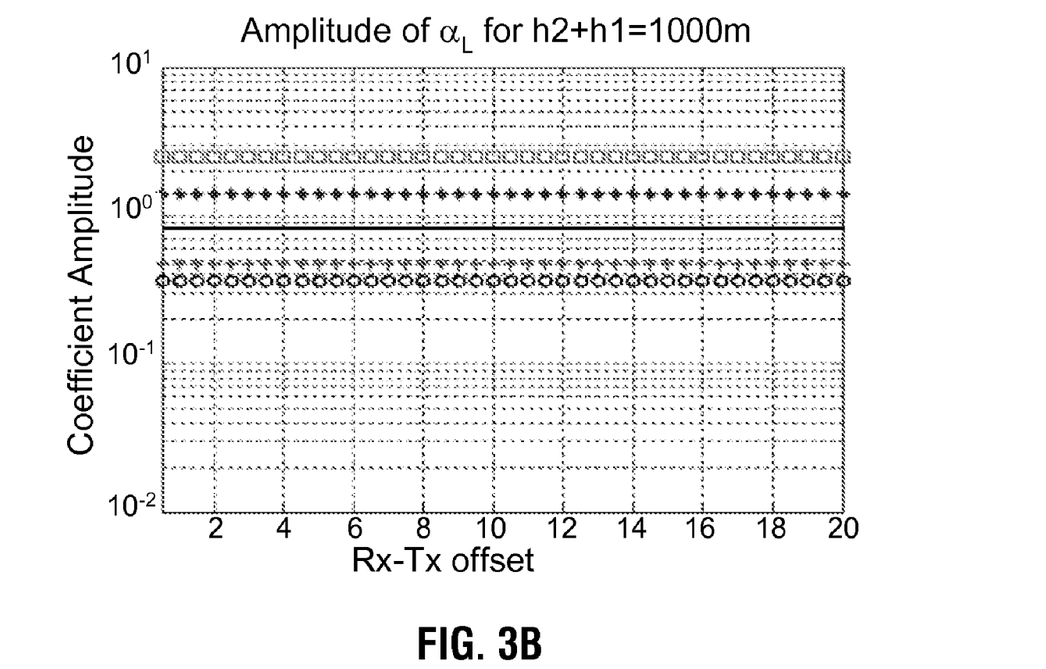

In a deep water scenario with shallow tow source, the water depth is greater than or equal to 300 m. The receiver is located at the sea bottom (h2=water depth), and the transmitter is on the sea surface (h1=0, i.e., shallow tow source). FIGS. 3A-3B illustrate the results for the three coefficients $\alpha_D$, $\alpha_I$, and $\alpha_L$ (with h2=1,000 m). Five frequencies (1.25, 0.75, 0.25, 0.083, and 0.027 Hz) are used.

As shown in FIG. 3A, for $\alpha_D$ and $\alpha_I$ there is little change compared with the shallow water scenario. Both the direct-wave response and image-wave response are significantly increased by taking the derivatives. For $\alpha_L$ (FIG. 3B), the amplitude is increased compared with the shallow water case. For instance, when the frequency=0.25 Hz, $\alpha_L$=0.8, which is 10 times $\alpha_L$ in the shallow water. In other words, the lateral wave is not suppressed as much as in the shallow case.

However, since direct- and image-wave responses are enhanced by taking the derivative, it is expected that taking the derivative of the electric field data with respect to frequency also still serves to suppress the lateral wave response as compared to the direct- and image-wave responses.

Figure 4A:
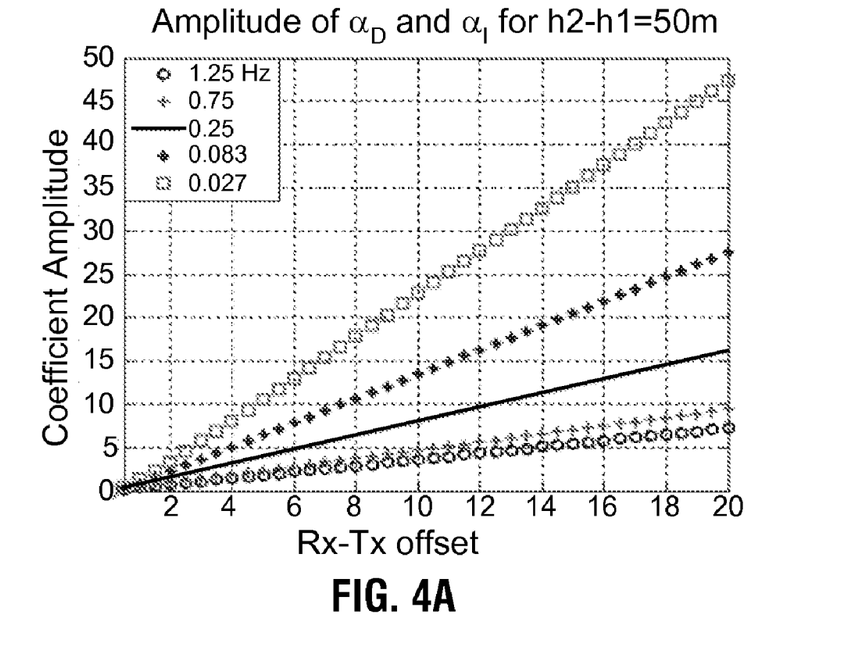
Figure 4B:
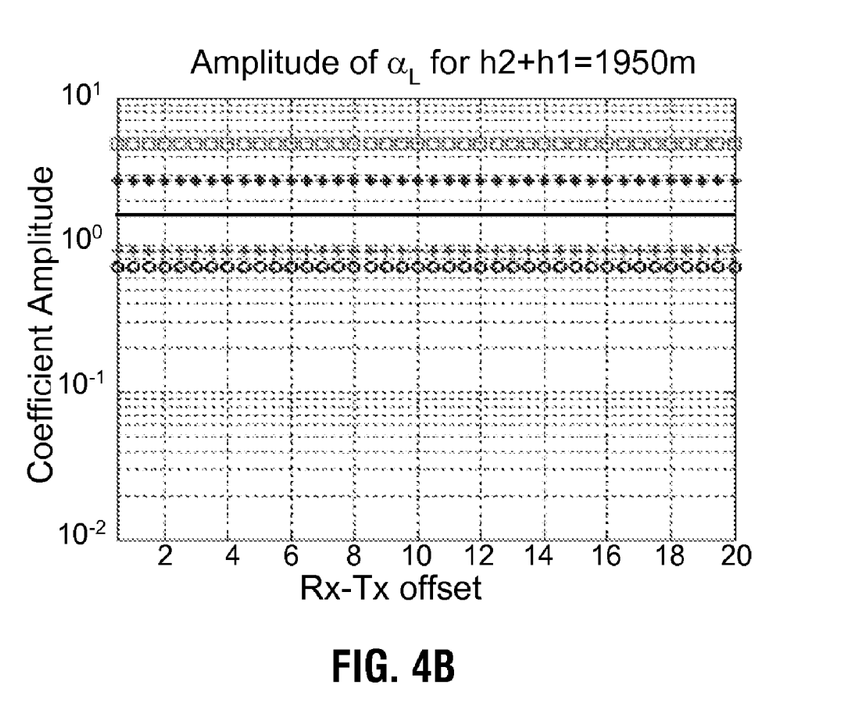

The third scenario involves the deep water arrangement with deep tow source, in which the EM transmitter is towed near the water bottom surface. FIGS. 4A-4B show the results for the three coefficients assuming the water depth is 1,000 m and the transmitter is at a depth of 950 m. The same five frequencies are used as in FIGS. 2A-2B and 3A-3B. The direct- and image-wave responses are still enhanced by taking the derivative, as compared to the original direct- and image-wave responses. Note, however, that the coefficient $\alpha_L$ the lateral-wave response for certain frequencies exceeds 1, which means that the lateral-wave response is enhanced by taking the derivative. However, even though $\alpha_L$ may be greater than 1, the enhancement of the lateral-wave response is not as great as the enhancement of the direct field and image field (which are enhanced by a factor of 3 to 8). Therefore, taking the derivative of the electric field data with respect to frequency can still provide for some relative suppression of the lateral wave in the deep water scenario with deep tow source.

Another scenario involving the deep water arrangement in which the air-wave effect may be present is in an arrangement with a large transmitter-receiver offset. The techniques according to some embodiments could also be applied in this scenario to reduce the air-wave effect.

In Eqs. 24 and 25 above, the derivative is taken with respect to the radial electric field $E_\rho(\rho, z, \phi)$. In an alternative embodiment, the derivative can be taken with respect to the total electric field. As yet another alternative, the derivative can be taken with respect to a magnetic field H measurement for the purpose of suppressing the air-wave effect. As yet a further alternative, instead of using electric fields or magnetic fields directly in the calculations, ratios can be used instead, such as ratios of an electric field to a magnetic field (e.g., $E_x/H_y$) or a ratio of electric fields in different orientations (e.g., $E_x/E_z$), where x and y refer to coordinates in a plane parallel to the water bottom surface 104, and z refers to a coordinate that is perpendicular to the water bottom surface. Alternatively, phase differences, ellipticity, or tilt angle calculations can also be used. As yet another alternative, frequency derivatives of spatial derivatives of the measurement data can be used.

Thus, generally, calculating the derivative of measurement data can refer to calculating the derivative of the measurement data directly (e.g., derivative of the electric or magnetic measurement data), or calculating the derivative of a function applied to the measurement data (e.g., ratio of electric/magnetic field data, spatial derivative of the measurement data, etc.).

Figure 5A:
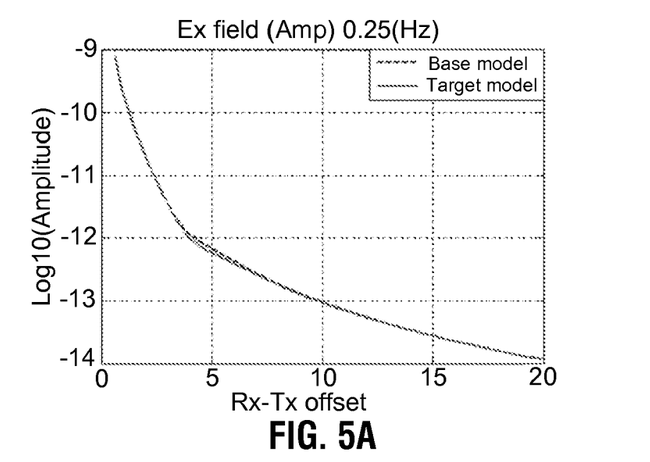
FIG. 5A-5C illustrate curves representing responses as a function of receiver-transmitter offsets.
Figure 5B:
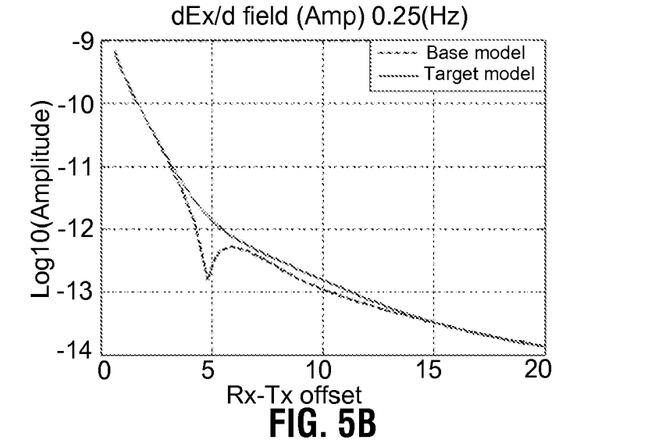
Figure 5C:
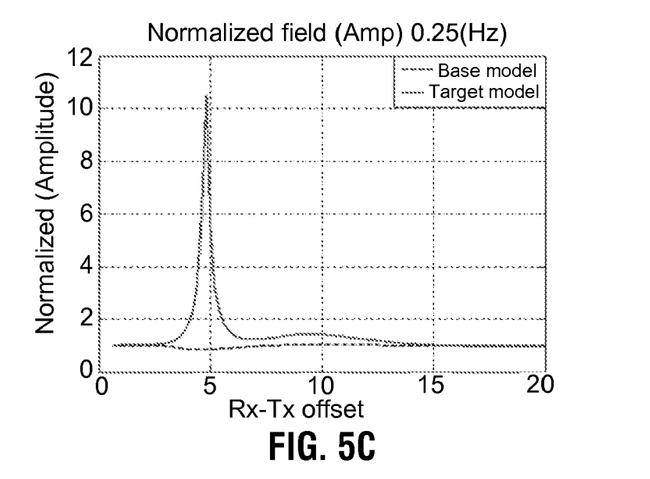

FIGS. 5A-5C illustrate responses ($\log_{10}$ amplitudes) as a function of receiver-transmitter offsets in a shallow water scenario. Two curves are depicted in FIG. 5A, which include a first curve (dashed curve) that represents a base model (or background model) in which the thin resistive body of interest is not present in the subterranean structure, and a second curve (solid curve) representing a reservoir model (resistor model) that includes a resistive body of interest in the subterranean structure. As depicted in FIG. 5A, the two curves have a very small difference such that the resistive body at depth would be difficult to detect.

FIG. 5B shows the results of taking the derivative of electric field data with respect to frequency. As explained above, the air-wave component has been suppressed while the direct and image fields are enhanced. Therefore, responses due to the subterranean structure stand out from the background responses.

FIG. 5C shows the normalized curves, where the derivative of the electric field data is divided by the base electric field data to show the spike that is representative of the difference between the reservoir response and the background response.

Figure 6:
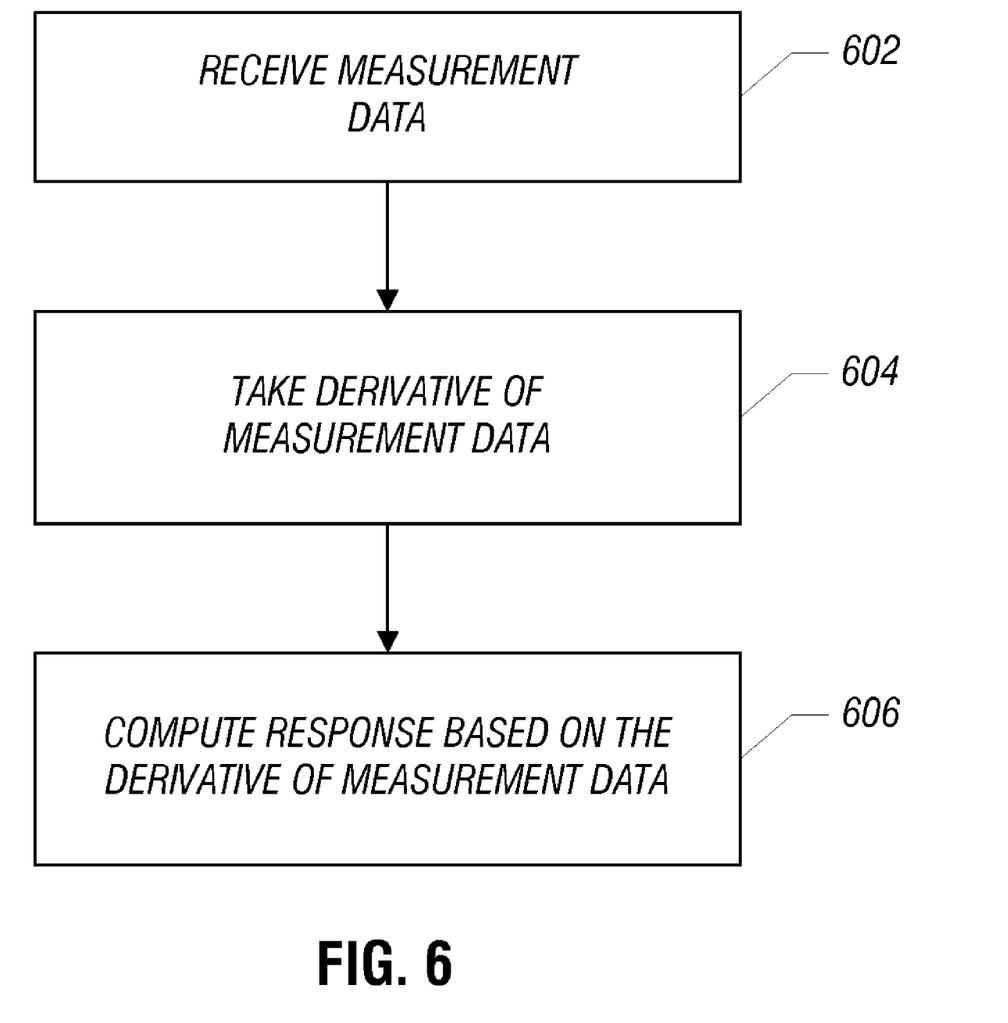
FIG. 6 is a flow diagram of a process of processing measurement data representing a subterranean structure, according to an embodiment.

FIG. 6 shows processing of measurement data according to an embodiment. Measurement data is received (at 602) by the processing software 118 in the computer 116 of FIG. 1. The measurement data is collected by the EM receivers 110.

The processing software 118 takes the derivative of the measurement data (at 604). The response is then computed (at 606) based on the derivative of the measurement data, where the response contains an air-wave component that has been suppressed due to taking of the derivative relative to another component (direct component and/or image component) that is contained in the response.

Instructions of software described above (including processing software 118 of FIG. 1) are loaded for execution on a processor (such as one or more CPUs 120 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of processing measurement data representing a subterranean structure, comprising:
receiving the measurement data collected by at least one survey receiver;
computing a derivative of the measurement data with respect to frequency; and
computing a response representing the subterranean structure based on the derivative of the measurement data, wherein the response contains a particular component that has been suppressed due to computing the derivative of the measurement data relative to at least another component that is sensitive to the subterranean structure.

2. The method of claim 1, wherein receiving the measurement data comprises receiving electric field data, and wherein computing the derivative comprises computing the derivative of the electric field data.

3. The method of claim 1, wherein receiving the measurement data comprises receiving magnetic field data, and wherein computing the derivative comprises computing the derivative of the magnetic field data.

4. The method of claim 1, wherein computing the derivative comprises computing the derivative of function applied to the measurement data.

5. The method of claim 1, wherein receiving the measurement data comprises receiving the measurement data collected by at least one electromagnetic receiver.

6. The method of claim 1, wherein receiving the measurement data collected by the at least one survey receiver comprises receiving the measurement data collected by the at least one survey receiver in a marine survey arrangement.

7. The method of claim 1, wherein receiving the measurement data collected by the at least one survey receiver is in a deepwater marine survey arrangement.

8. The method of claim 1, wherein receiving the measurement data collected by the at least one survey receiver comprises receiving the measurement data collected by the at least one survey receiver in a land-based survey arrangement.

9. The method of claim 8, wherein receiving the measurement data collected by the at least one survey receiver is in a shallow water marine survey arrangement.

10. The method of claim 1, wherein the particular component that has been suppressed comprises an air-wave signal component.

11. The method of claim 10, wherein computing the derivative causes the air-wave signal component to be suppressed with respect to an original version of the air-wave signal component prior to computing the derivative.

12. The method of claim 10, wherein computing the derivative causes the at least another component that is sensitive to the subterranean structure to be enhanced with respect to an original version of the at least another component prior to computing the derivative.

13. The method of claim 10, wherein the at least another component comprises a direct-wave response and a modified-image response.

14. The method of claim 10, wherein computing the derivative causes the at least another component that is sensitive to the subterranean structure to be enhanced by a first factor with respect to an original version of the at least another component prior to computing the derivative, and causes the air-wave signal component to be enhanced by a second factor with respect to an original version of the air-wave signal component prior to computing the derivative,
wherein the first factor is greater than the second factor.

15. An article comprising at least one computer-readable storage medium containing instructions that when executed cause a computer to:
- receive measurement data collected by at least one electromagnetic receiver;
- compute a derivative of the measurement data with respect to frequency; and
- compute a response representing the subterranean structure based on the derivative of the measurement data, wherein the response contains an air-wave signal component that has been suppressed due to computing the derivative of the measurement data relative to at least another signal component that is sensitive to the subterranean structure.

16. The article of claim 15, wherein computing the derivative causes the air-wave signal component to be suppressed with respect to an original version of the air-wave signal component prior to computing the derivative.

17. The article of claim 16, wherein computing the derivative causes the at least another signal component that is sensitive to the subterranean structure to be enhanced with respect to an original version of the at least another signal component prior to computing the derivative.

18. The article of claim 17, wherein the at least another signal component comprises a direct-wave response and a modified-image response.

19. A computer comprising:
- a processor; and
- processing software executable on the processor to:
  - receive measurement data collected by at least one survey receiver;
  - compute a derivative of the measurement data with respect to frequency; and
  - compute a response representing the subterranean structure based on the derivative of the measurement data, wherein the response contains an air-wave component that has been suppressed due to computing the derivative of the measurement data relative to at least another component that is sensitive to the subterranean structure.

20. The computer of claim 19, wherein the measurement data comprises measurement data collected by at least one electromagnetic receiver.

* * * * *